Figure 1:
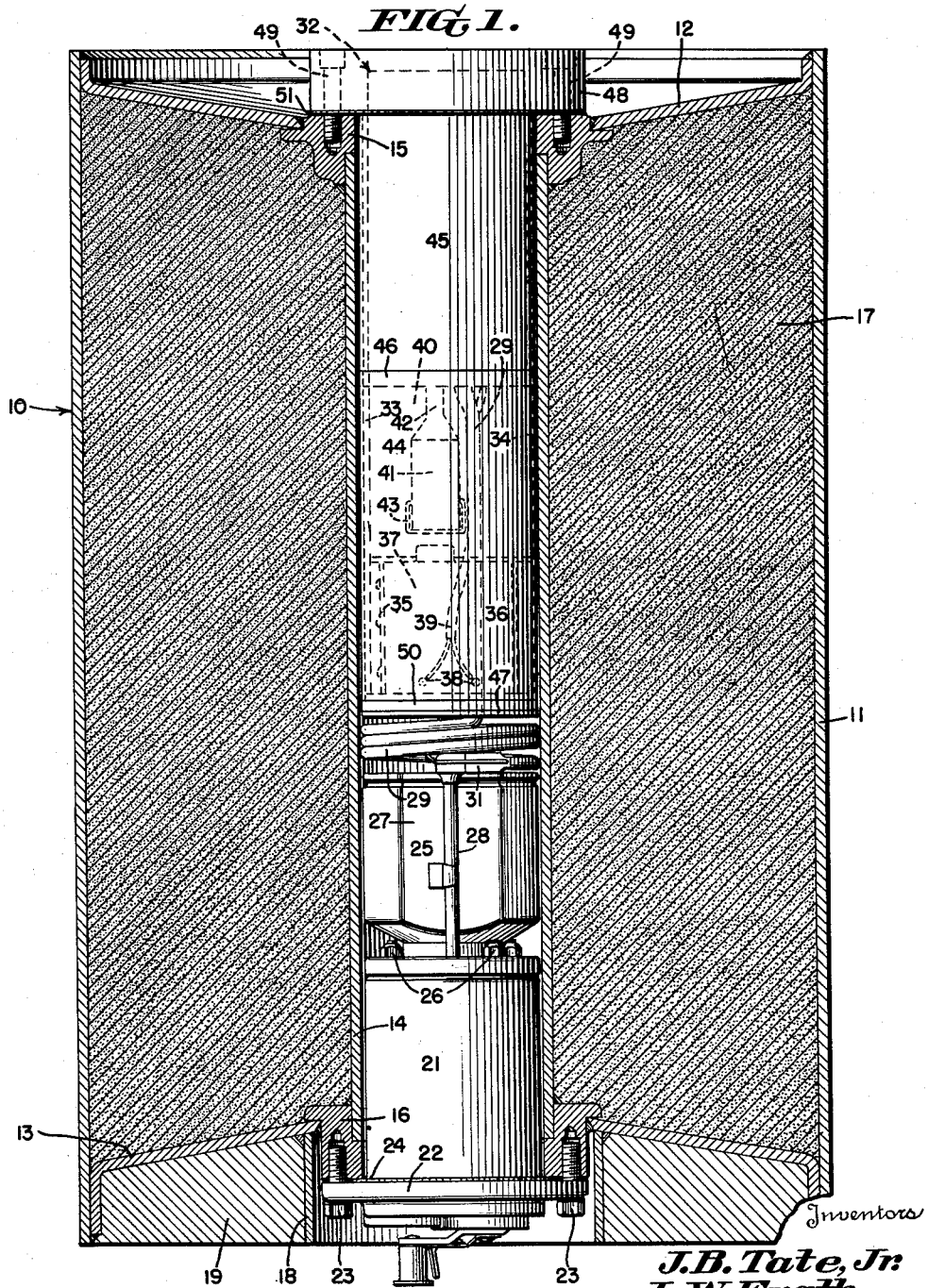

Dec. 22, 1964  J. B. TATE, JR., ETAL  3,162,119
DEPTH CHARGE FIRING CONTROL SYSTEM
Filed Oct. 8, 1945  2 Sheets-Sheet 1

Inventors
J.B. Tate, Jr.
L.W. Erath
By Ralph T. Chappell
Attorney

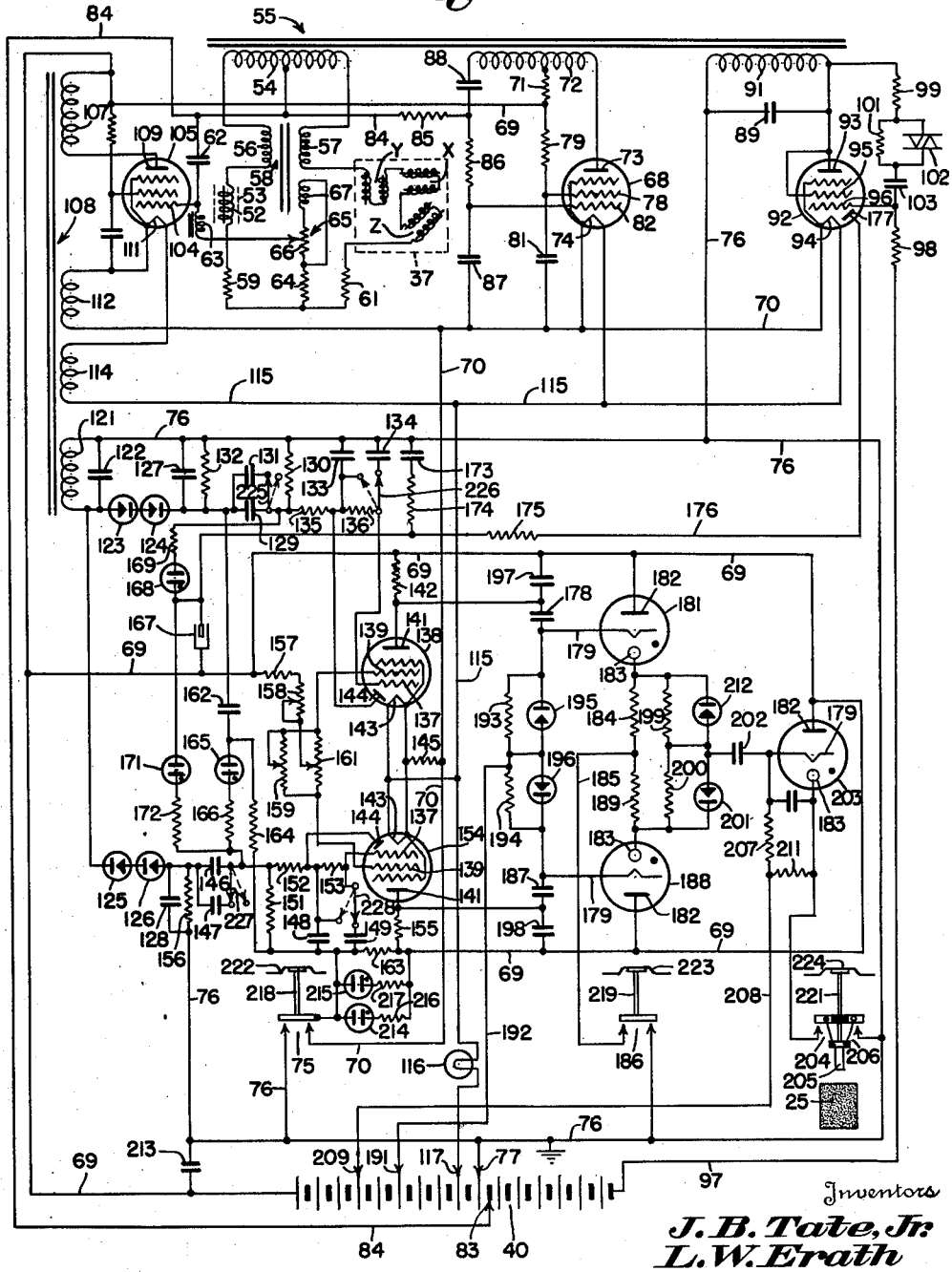

3,162,119
DEPTH CHARGE FIRING CONTROL SYSTEM
Joseph B. Tate, Jr., 3926 Southern Ave. SE., and Louis W. Erath, 4087 Minnesota Ave. NE., both of Washington, D.C.
Filed Oct. 8, 1945, Ser. No. 621,155
17 Claims. (Cl. 102—18)
(Granted under Title 35, U.S. Code (1952), sec. 266)

This invention relates generally to control systems and more particularly to a depth charge firing control system in which the depth charge is fired in response to predetermined changes in the scalar value of the ambient magnetic field detected by the depth charge as it moves within the vicinity of a submarine to be destroyed thereby, it being well known that the presence of a submarine, or other ponderous mass of magnetic material, within the earth's magnetic field causes the ambient field of the depth charge to be altered or changed as the depth charge changes its position with respect to the submarine.

In accordance with the control system of the present invention, the depth charge is caused to be fired when the scalar value of the ambient field changes by a predetermined amount first in one direction as the depth charge moves within the vicinity of a submarine and thereafter changes by the same amount in the opposite direction. Firing of the depth charge in response to such changes in the value of the field is accomplished by means of a control circuit including a pair of electronic control channels, one of which is rendered responsive to an increase in the scalar value of the ambient field and is actuated when the scalar value has increased by the predetermined amount. The other channel similarly is rendered responsive to a decrease in the scalar value of the ambient field and is actuated when the scalar value has decreased by substantially the same predetermined amount. When both channels are actuated, they together produce a voltage adapted to initiate operation of a firing circuit for the depth charge.

The changes in the scalar value of the magnetic field are detected by means of a total field magnetometer having a plurality of matched and orthogonally disposed inductors adapted together to yield an inductance depression substantially proportional to the square of the scalar value of the field, the square law response being obtained when the inductor elements are excited by a pure sinusoidal current of optimum value and when the inductor elements are closely matched and orthogonally disposed with the greatest exactness possible. Thus, when square law response is obtained, small changes in the scalar value of the ambient field produce small increases and decreases in the inductance of the magnetometer in accordance with decreases and increases in the scalar value of the field respectively, the changes in inductance being directly proportional to the product of the small changes in the field and the scalar value of the gradient-free or uniform field. The gradient-free value of the field is that value corresponding to the total strength or scalar value of the earth's magnetic field in the zone of the earth in which the depth charge is launched.

The magnetometer is arranged as one leg of an inductance bridge circuit to which the aforesaid exciting current is supplied from a suitable oscillator having means associated therewith for controlling the amplitude of the oscillator output whereby the optimum value of the exciting current is maintained substantially constant regardless of voltage changes in the power supply for the oscillator and changes in the charcteristics of the electron discharge devices comprising the oscillator and its amplitude regulator. The bridge circuit preferably is initially balanced in an external field having a value other than any of the values within the range of the earth's magnetic field in order that a null condition of the bridge circuit be not obtained in response to the earth's magnetic field. The bridge circuit thus assumes a degree of unbalance in accordance with the scalar value of the ambient field of the detector corresponding to the scalar value of the earth's magnetic field in the zone of the earth in which the depth charge is launched. The unbalance of the bridge thereafter is altered further to a greater or lesser degree in accordance with changes in the scalar value of the ambient field as the depth charge moves within the vicinity of a submarine, the output of the bridge thus providing an electrical signal which varies in value in accordance with changes in the scalar value of the field.

When square law or quadratic response is obtained from the magnetometer detector, the depth charge associated therewith may be moved angularly about within the gradient-free or uniform magnetic field of the earth without producing spurious signals indicative of apparent changes in the ambient field of the depth charge. Due to the variable character of the detector impedance, however, harmonic frequency voltage components appears across the magnetometer inductors which cause harmonic frequency currents to flow in the bridge circuit. Harmonic frequency currents flowing in the bridge circuit intermodulate and produce changes in the amplitude of the fundamental frequency current such that the square law response is impaired. Means, therefore, are provided in the bridge circuit of the present invention to reduce the flow of harmonic frequency currents to a minimum and to otherwise improve the quadratic response of the detector. Means also are provided in the aforesaid electronic control channels for filtering spurious signal components resulting from non-quadratic response however caused.

Power is supplied to the filaments of vacuum tubes comprising the aforesaid electronic control circuit when the depth charge becomes immersed in water upon launching thereof, and the increase in various voltage values throughout the control circuit, as the vacuum tubes become actuated, appear as spurious signals which would be adapted, unless substantially eliminated, to effect various operations in the control circuit, these operations, under certain conditions of operation, being sufficient to fire the depth charge. These voltages also would prevent rapid stabilization of the control circuit in time to render it responsive to a submarine submerged at a shallow depth. Accordingly, means are provided for discriminating against such spurious signals resulting from arming operations of the control circuit. The character of the control circuit also is such as to make operation thereof possible in response to sudden impulses of pressure received through the water such, for example, as those resulting from countermine shocks. Accordingly, means also are provided in the control circuit for preventing operation of the circuit in response to countermine shocks received by the depth charge and for rapidly restoring sensitivity of the depth charge after such shocks have been received.

An object of the present invention is to provide a new and improved firing control system for a depth charge in which the depth charge is fired in response to predetermined changes in the scalar value of the ambient magnetic field within which it moves subsequent to launching thereof.

Another object is to provide a firing control system for a depth charge in which the depth charge is fired when the scalar value of the ambient field within which the depth charge moves subsequent to launching thereof is changed first in one direction by a predetermined amount and thereafter changes in the opposite direction by the same amount as the depth charge moves within the vicinity of a submarine to be destroyed thereby.

Another object is to provide a firing control system for a depth charge in which an electrical signal is produced variably in accordance with changes in the scalar value of the ambient magnetic field of the depth charge and in which the depth charge is fired as the signal is either increased or decreased and thereafter is decreased or increased respectively to predetermined values.

A further object is to provide an electronic control circuit which will fire a depth charge in response to predetermined changes in the scalar value of the ambient magnetic field in which the depth charge moves subsequent to launching thereof and which will not fire the depth charge by reason of spurious voltages produced by the control circuit during the arming thereof or in response to countermine shocks received thereby.

Still another object is to provide a depth charge firing control circuit which will be stabilized rapidly at full sensitivity upon arming thereof and which will be restored rapidly to full sensitivity after countermine shocks have been received thereby.

An additional object resides in the provision of a new and improved inductance bridge circuit for use with a total field magnetometer detector adapted to produce an inductance depression substantially proportional to the square of the scalar value of an external magnetic field in which the bridge circuit is adapted to reduce distortion of the bridge output due to intermodulation of harmonic frequency currents in the bridge circuit.

Still another object is to provide an inductance bridge circuit for a total field detector in which the bridge circuit is arranged to prevent unbalance of the bridge due to variations in the value of the exciting current supplied thereto.

A still further object is to provide an oscillator having new and improved means for maintaining the amplitude of oscillation thereof substantially constant.

Still other objects, advantages and features of the present invention are those implied from or inherent in the novel combination and arrangement of parts as will become more clearly apparent as the description proceeds, reference being had to the accompanying drawings wherein:

FIG. 1 is a sectional view of a complete depth charge suitable for use with the depth charge firing control system of the present invention; and FIG. 2 is a diagrammatic view of a complete electrical circuit of a depth charge firing control system according to a preferred embodiment of the invention.

Referring now to the drawings and more particularly to FIG. 1 thereof, the numeral 10 generally designates a depth charge comprising a cylindrical wall 11 having walls 12 and 13 respectively secured to the ends thereof as by welding or otherwise rigidly secured and sealed thereto in watertight relation therewith. Arranged within the cylindrical wall 11 and preferably centrally with respect thereto is a tubular member 14 having flanged members 15 and 16 secured and sealed to the ends thereof in any suitable manner. The end walls 12 and 13 are provided with centrally arranged apertures to receive the flanged members 15 and 16 respectively whereby these members may be secured and sealed to the end walls.

The unoccupied space within the casing provided by walls 11, 12, and 13 is filled with TNT 17 which may be cast therein in the usual manner and substantially as shown in FIG. 1. One end of the depth charge is preferably weighted to cause the same to assume an upright position within the water with the axis of the casing in a substantially vertical position as the depth charge descends through the water. For this purpose, a circular partition 18 is secured to end wall 13 and is disposed concentrically about member 14. Arranged within the space provided by the partition is a mass of heavy non-magnetic material 19 which may be of any type suitable for the purpose such, for example, as lead.

Disposed within tubular member 14 is a hydrostatically controlled firing mechanism or pistol generally designated by the numeral 21 and having a flanged support 22 by means of which the pistol is secured rigidly to flange 15 as by a plurality of bolts 23, a gasket 24 being interposed between flanges 15 and 22 to provide a watertight connection therebetween. The pistol has a booster charge 25 secured thereto as by a plurality of nuts 26. The pistol generally may be of the same type as disclosed in the copending application of Robert M. Cate et al. for Depth Charge Arming Device, Serial No. 596,065, filed May 26, 1945, which matured into U.S. Patent 2,789,502 on April 23, 1957, and reference may be had thereto for details of construction. It suffices herein merely to state that the pistol operates in response to the pressure of the surrounding water to move an electroresponsive detonator into operative firing relation with respect to the aforesaid booster charge and, concurrently therewith, operates to connect the detonator into a firing circuit therefor. The pistol also comprises hydrostatically controlled switch means for closing the firing circuit selectively at a preselected one of a plurality of depths, and further includes auxiliary hydrostatic switches which operate independently of the aforesaid switch means and are employed for use with apparatus associated with the pistol in the depth charge.

The booster charge has a flattened side wall 27 along which a cable 28 extends to a cable 29 to which it is electrically connected by means of a plug and socket connection generally designated 31. Cable 28 comprises a plurality of electrical conductors connected to the aforesaid hydrostatic switches and detonator of pistol 21.

Cable 29 extends, and is connected, to a total field firing control mechanism generally designated 32 and having a pair of frame members 33 and 34 secured to opposite sides thereof respectively, these members having brackets 35 and 36 for supporting a total field magnetometer detector 37 in fixed spaced relation with respect to the mechanism 32. The detector has a pair of terminals 38 from which the leads comprising a cable 39 extend to the firing mechanism 32. A battery 40 is disposed within the space between the mechanism 32 and detector 37 and has a multi-contact socket adapted to receive a cooperating plug 41 which conveniently may be pulled from the socket by means of a handle 43 carried thereby. A cable 42 interconnected between the mechanism 32 and plug 41 serves as the power line for supplying electrical energy to the mechanism.

Mechanism 32, detector 37 and battery 40 are housed as a unit in a non-magnetic casing comprising two cylindrical portions or shells 44 and 45 which are telescopically engaged as at 46. The opposite end of portion 44 is sealed by a cover 47 having a gasket 50 interposed between the cover and portion to provide a watertight connection therebetween. The opposite end of portion 45 is provided with a flange 48 whereby the unit is secured to flange 16 as by a plurality of bolts 49, a gasket 51 being interposed between the flanges 16 and 48 whereby a watertight joint is provided therebetween.

Pistol 21 has means settable at will for selectively rendering either the depth controlled switch of the pistol or the total field unit including the detector 27 and control mechanism 32 therefor effective to fire the electroresponsive detonator within the pistol. The present invention, however, is directed specifically to that part of the control system which includes the total field unit and is responsive to changes in the scalar value of the ambient field of the depth charge. Accordingly, selective firing of the depth charge under hydrostatic control of the pistol will not be considered herein.

Referring now to FIG. 2, it will be seen that magnetometer detector 37 comprises three pairs of matched, Permalloy core coils X, Y and Z disposed respectively in three mutually perpendicular planes in accordance with the arrangement of the total field magnetometer disclosed in the copending application of Everett M. Hafner for Magnetometer, Serial No. 609,307, filed August 6, 1945.

The Permalloy core coils or inductor elements are so constructed that each element yields an inductance depression which is proportional to the square of the component of an external magnetic field parallel to the magnetic axis thereof when the element is excited by a pure sinusoidal current of optimum value. The coils are connected in series and the coils lying in the same plane are connected with opposed magnetic polarities such that even harmonic frequency voltages generated by the coils due to the variable character of their impedances cancel, thereby to substantially eliminate the flow of even harmonic frequency currents in the coils. Thus, the elements together yield an inductance depression which is substantially proportional to the square of the scalar value of an external magnetic field when the series connected elements are excited by a common sinusoidal current of optimum value.

The foregoing proportionality may be expressed by the following equation:

(1) $$\Delta L = L_0 - L = KH^2 + K_1 H^4 + K_2 H^6 + \ldots$$

where $\Delta L$ = the inductance depression
$L_0$ = the inductance of the detector for zero external field
$L$ = the inductance of the detector for a total field of scalar value H
$K, K_1, K_2$ are proportionality factors
$H$ = the scalar value of the total external field.

For a fixed value of sinusoidal exciting current, $K$, $K_1$ and $K_2$ are constants, being functions of the exciting current. Over a limited range of field strength H such, for example, as the range of values of the earth's magnetic field, $K_1$ and $K_2$ are of such small value that Equation 1 may be written (2) $$\Delta L = KH^2$$

Thus, the inductance depression for limited ranges of field strengths is substantially proportional to the square of the scalar value of the external field. Differentiating Equation 2 gives (3) $$d(\Delta L) = d(L_0 - L) = -dL = 2KHdH$$

Accordingly, it is seen that small changes in inductance are proportional to the product of the scalar value of the field and small changes therein.

Detector 37 is arranged as one leg of an inductance bridge circuit which includes as its second leg a balance element 52 for the detector. By reason of the variable character of the impedance of the detector, the inductance thereof also varies in response to changes in the bridge current due to variations in the bridge supply voltage, thus producing unbalance of the bridge circuit as the value of the bridge current changes. To compensate for such unbalance, balancing coil 52 also is provided with a Permalloy cored coil such that the inductance of coil 52 varies in the same manner as that of the detector in response to variations in the bridge current, thus preventing changes in the degree of unbalance of the bridge circuit due to changes in the bridge current. Coil 52, however, is provided with a Permalloy shield designated 53 for preventing variations in the inductance of the coil in response to changes in the external field.

The third and fourth legs of the inductance bridge comprise matched portions of a secondary winding 54 of an iron core transformer generally designated 55. The bridge circuit also includes matched windings 56 and 57 of an iron core transformer generally designated 58, windings 56 and 57 being employed for the purpose of presenting a high impedance to the flow of harmonic frequency currents in the bridge circuit. Harmonic frequency currents flowing in the bridge circuit intermodulate and produce a distortion of the output of the bridge circuit. Use of windings 56 and 57 in the bridge circuit also makes the total impedance of the circuit large as compared to impedance changes produced therein by variations in the inductance of detector 37. Accordingly, such impedance changes produce relatively small changes in the value of the exciting current supplied to the bridge circuit.

The bridge circuit further includes resistors 59 and 61 for providing a resistance balance therein. The output circuit of the bridge circuit includes a condenser 62, iron core inductance coil 63, resistance 64 and a voltage source generally designated 65. The voltage source includes a potentiometer 66 which is connected in a closed circuit with secondary winding 67 of transformer 58. The voltage developed across the portion of the potentiometer between the wiper thereof and resistor 64 is used to provide the desired degree of balance in the bridge circuit, and resistor 64 is varied, as is desired, to vary the sensitivity of the bridge output circuit. Condenser 62 and coil 63 together with the bridge inductance as seen from its output are tuned to provide series resonance whereby the impedance to the flow of current through the output circuit is entirely resistive in character and a voltage appears across condenser 62 which is many times the value of the voltage which appears across the output of the bridge circuit between the center tap of winding 54 and the wiper of potentiometer 66. Thus, considerable gain is realized from the resonant circuit.

The voltage appearing across condenser 62 provides an electrical signal which varies in value in accordance with changes in the scalar value of the external ambient field of the detector, the bridge being balanced at any convenient value of an external magnetic field such that a desired degree of unbalance is obtained in response to the scalar value of the earth's magnetic field in the region of the earth in which the detector is employed.

As set forth hereinbefore, one of the conditions for quadratic response is that the bridge circuit be supplied with a pure sinusoidal current of optimum value. This current is supplied by an oscillator comprising a conventional pentode vacuum tube 68. The plate circuit for tube 68 is supplied from battery 40 and is completed therefrom by way of conductor 69, plate load resistor 71, the right hand portion, as viewed in the drawing, of primary winding 72 of transformer 55, plate 73 and cathode 74 of tube 68, conductor 70, hydrostatic switch 75 and thence by way of conductor 76 to ground potential at tap 77 of battery 40. Screen grid 78 of tube 68 receives its operating potential from conductor 69 by way of resistor 79 and is coupled to ground potential through switch 75 by means of the conventional A.C. bypass condenser 81. Control grid 82 of tube 68 normally is maintained at a negative potential with respect to ground by reason of its connection with battery tap 83 by way of conductor 84 and resistors 85 and 86. Voltage also is applied to control grid 82 from conductor 69 by way of a circuit including resistor 71, the left hand portion of winding 72, as viewed in the drawing, condenser 88, resistor 86 and thence by way of condenser 87 and conductor 70 to ground potential through switch 75. The voltage thus applied to control grid 82 from load resistor 71 and winding 72 is substantially 180° out of phase with the voltage applied to plate 73 from load resistor 71 and the winding and, accordingly, operation of oscillator tube 68 is inherently regenerative in character. Resistor 71 provides negative feedback in proportion to the flow of current therethrough and thus tends to stabilize the frequency and amplitude of oscillation of the oscillator. Condenser 87 serves to eliminate parasitic oscillations at a high order of frequencies for the reason that it provides a bypass for voltages at such frequencies.

The oscillator is tuned to a desired frequency such, for example, as 3000 cycles per second by the selection of the value of condenser 89 in relation to the combined inductive effects of windings 54, 72 and 91 of transformer 55 and the inductive effects of the bridge circuit including magnetometer detector 37, condenser 89 preferably being connected across winding 91, as shown. The oscillator builds up at this frequency to the desired amplitude of oscillation due to its inherent regeneration, and is limited at the desired amplitude by means of a regulator tube 92 together with its associated circuit elements. Tube 92 may be a conventional amplifier vacuum tube of any type, but preferably includes a diode section for reasons hereinafter to appear.

The plate circuit for tube 92 may be traced from winding 91 of transformer 55, plate 93 and cathode 94 of tube 92, conductor 70, hydrostatic switch 75 and thence by way of conductor 76 at ground potential on the other side of winding 91, screen grid 95, in this case, being connected to plate 93. Control grid 96 of tube 92 is normally biased at a negative potential such, for example, as 96 volts negative with respect to ground potential at tap 77 of battery 40 and is connected to the low potential side of the battery by way of conductor 97 and resistor 98. The control grid also has voltage applied thereto from secondary winding 91 of transformer 55 by way of a grid circuit including resistor 99, resistor 101 and varistor 102 in parallel, and thence by way of condenser 103 to grid 96. By reason of the large negative bias on control grid 96, the amplifier section of tube 92 conducts only during peak portions of positive half cycles of the A.C. voltage applied to the control grid. However, when the voltage across winding 91 reaches such a value that the negative voltage on the control grid is reduced to a predetermined value, sufficient energy is drawn by the tube from the tuned circuit of the oscillator, thereby rendering tube 68 less regenerative in operation and thus causing a reduction in the voltage across windings 54, 72 and 91. Thus, the optimum value of the voltage supplied to the bridge circuit including winding 54 is maintained substantially constant. This voltage is held within very close limits for the reason that small percentage changes in the A.C. voltage at grid 96 of regulator tube 92 produce relatively large percentage changes in the flow of current through the tube. Varistor 102 is employed for the purpose of compensating for variations in circuit parameters with temperature. This is accomplished by causing the voltage division in the grid circuit to vary as the varistor changes value in response to the temperature variations. Resistor 99 is initially selected of such value as to provde a desired voltage division in the grid circuit.

The electrical signal appearing across condenser 62 is applied to the control grid 104 of a conventional pentode amplifier vacuum tube 105, the control grid being normally biased at a negative potential with respect to ground potential by reason of its connection to conductor 84 by way of inductance 63 and the bridge circuit. The plate circuit of tube 105 is supplied from battery 40 and may be traced from the high potential side thereof by way of conductor 69, primary winding 107 of transformer 108, plate 109, cathode 111, and thence by way of winding 112 of transformer 108 to ground potential at conductor 76 by way of conductor 70 and switch 75 in parallel with winding 114 of transformer 108 which is connected by way of conductor 115 and an incandescent lamp 116 to battery tap 117 which is at a positive potential with respect to ground at tap 77. The voltage developed across winding 112 is applied to the cathode with such polarity with respect to the polarity of the voltage applied to the plate from primary winding 107 that degenerative feedback is provided for tube 105, thereby to stabilize the operation thereof substantially instantaneously in order to avoid drift at the input of the amplifier. Drift would produce voltages in the output of the amplifier, which voltages would appear as apparent signals. Cathodes 111, 74 and 94 of tubes 105, 68 and 92 respectively are of the filament type and receive their energy from tap 117 by way of lamp 116 and conductor 115. Lamp 116 is employed for the purpose of providing rapid heating of the filaments with a subsequent reduction in the filament voltage. This is accomplished by use of the lamp for the reason that its resistance varies with temperature.

The amplified output of tube 105 appears across secondary winding 121 of transformer 108, and a condenser 122 is connected thereacross to tune the secondary winding in order to provide proper impedance matching with the tube. The voltage appearing across winding 121 is applied to a pair of electronic control channels adapted to respond to increases and decreases in the voltage, which increases and decreases correspond to signals received in response to variations in the scalar value of the field. These channels are identified by series connected copper oxide rectifiers 123 and 124 individual to one of the channels and similar rectifiers 125 and 126 individual to the other of the channels.

Rectifiers 123 and 124 are connected to winding 121 with polarities opposite to those of rectifiers 125 and 126, the polarities of the rectifiers being established by reason of their connections with winding 121. Thus, condenser 127 associated with rectifiers 123 and 124 of one of the control channels is charged substantially to the positive peak value of the steady state or no signal voltage appearing across winding 121. Similarly, condenser 128 associated with rectifiers 125 and 126 in the other control channel is charged substantially to the negative peak value of the steady state voltage appearing across winding 121.

Parallel connected condensers 129 and 131 also are charged to the potential across condenser 127 by way of resistor 130, the low potential side of condensers 129 and 131 being at ground potential when the condensers are fully charged for the reason that resistor 130 is connected to winding 121 at ground potential on conductor 76. When a signal corresponding to a decrease from the steady state value of the voltage appearing across winding 121 is received, condenser 127 discharges by way of resistor 132 connected thereacross, and condensers 129 and 131 discharge by way of resistors 132 and 130, thus producing a voltage across resistor 130 which is negative with respect to ground potential. Similarly, when a signal corresponding to an increase in the voltage across winding 121 is received, a voltage which is positive with respect to ground potential is developed across resistor 130. In either case, high frequency components appearing as ripples in the signal voltage are attenuated by means of condenser 133 whereby such voltage components do not effectively change the potential across condenser 133 with respect to ground potential. Condenser 134 likewise serves to attenuate signals which change in value more rapidly than those within a predetermined frequency range determined by the rate of change of the scalar value of the ambient magnetic field, which rate of change in turn is controlled by the rate of change of position of the depth charge with respect to the submarine. The signals desired to be attenuated are those produced, for example, by excessive angular movement of the depth charge within the ambient magnetic field thereof.

When the signal is in the predetermined range of frequency, the negative voltage developed across resistor 130 is applied by way of resistors 135 and 136 to the control grid 137 of a conventional diode-pentode vacuum tube 138 whose operating potential is controlled through adjustment of the potential on its screen grid 139, as will be described in greater detail hereinafter. The operating point of the tube, however, is such as to render the tube conductive when the control grid thereof is at ground potential, thereby causing the plate of the tube to assume a low potential with respect to the voltage at the high potential side of battery 40, which battery potential may be in the order of 135 volts. It is desirable that the plate voltage for such valve of grid potential be in the order of 30 volts in order that the plate voltage may increase over a wide range in response to a negative signal applied to the grid and may decrease by a limited and substantially small amount in response to a positive signal applied thereto. The plate circuit of tube 138 may be traced from conductor 69 by way of plate load resistor 142, plate 141, and cathode 143 of tube 138 and thence by way of conductor 70 through switch 75 to ground potential at conductor 76. Thus, as the negative potential is applied to control grid 137, the plate potential rises in proportion to the decrease in the flow of current through the plate load resistor 142 and tube 138, thereby providing a voltage pulse of relatively great amplitude at the plate of the tube corresponding to the signal applied to the control grid thereof. As will appear more fully hereinafter, this voltage pulse is employed to fire a gas type trigger tube which, in turn, is utilized together with a similar trigger tube individual to the other of the control channels to control the firing circuit of the system.

When the received signal is of such polarity as to develop a positive voltage of sufficient amplitude across resistor 130 such as occurs principally during arming of the control circuit, the larger portion of the charging current of condensers 129 and 131 passes by way of resistor 135 through the diode section of tube 138, the diode section including plate 144 and cathode 143 of the tube. The cathode of tube 138 and that of tube 154 of the other control channel are of the filament type and are supplied from conductors 70 and 115 in the same manner as tubes 105, 68 and 92, a resistor 145 preferably being interposed in the filament circuit for tubes 138 and 154 to reduce the filament voltage thereof, whereby tubes 138 and 154 are caused to become activated after tubes 68, 92 and 105. By reason of such arrangement, the possibility of producing a complete operation of either of the control channels in response to arming of the control circuit is substantially reduced. By reason of the voltage on cathode 143, which voltage is above ground potential, the diode section of tube 138 is rendered non-conducting when the voltage at plate 144 thereof drops below the cathode potential. When this occurs, the remaining voltage is dissipated by way of the grid circuit of the tube, the remaining charging current flowing by way of resistor 136 and thence through grid 137 and cathode 143 of tube 138 to ground potential at conductor 70.

The electronic control channel including rectifiers 125 and 126 is generally similar in circuit arrangement to the aforedescribed control channel including rectifiers 123 and 124, this channel also having a pair of condensers 146 and 147 which are charged to the negative potential across condenser 128 and further comprises a 3000 cycle filtering condenser 148 and a spurious signal filtering condenser 149. Thus, when a signal corresponding to an increase in the steady state voltage across winding 121 is received, a negative voltage with respect to ground is produced across resistor 151, and this voltage is applied by way of resistors 152 and 153 to grid 137 of tube 154. Tube 154 may be identical to tube 138 and accordingly, like reference characters are employed to designate the same tube elements. As in the case of operation of tube 138, a negative voltage applied to the grid of tube 154 decreases the voltage drop across the plate load resistor 155 therefor, thus elevating the plate potential to provide a voltage pulse of relatively great amplitude sufficient to fire a gas type trigger tube associated therewith in a manner hereinafter to appear.

When the signal is of such polarity as to produce a voltage across resistor 151 which is positive with respect to ground potential, condenser 128 discharges through resistor 156 connected thereacross, and condensers 146 and 147 discharge by way of resistor 151, through ground potential by way of switch 75 and thence through resistor 156 to the other side of the condensers, thus producing the positive voltage drop across resistor 151. This voltage drop is dissipated by flow of the charging current of condensers 146 and 147 through resistor 152 and thence through the diode section of tube 154 as long as plate 144 of the tube is at positive potential with respect to cathode 143 thereof, the cathode of tube 154 being connected in parallel with that of tube 138.

The operating potentials for screen grids 139 of tubes 138 and 154 are supplied from conductor 69 by way of resistor 157, potentiometer 158 and parallel connected potentiometers 159 and 161, these potentiometers being employed for the purpose of setting and equalizing the no signal operating potentials of the plates of these tubes. By selectively adjusting the potentiometers, a desired and equalized gain for tubes 138 and 154 may be obtained without disturbing the desired operating potentials thereof.

It is desirable that the electronic circuits comprising the control system of the depth charge be rapidly stabilized upon arming of the depth charge as it becomes immersed in water upon launching thereof in order that it be ready to respond to a submarine within its vicinity. For example, as voltage is developed across condensers 127, 129 and 131 as the vacuum tubes of the system become activated, the charging current to condensers 129 and 131 is rapidly bypassed to ground through the diode section of tube 138, as described heretofore in connection with an increase in the voltage across winding 121 above the steady state value thereof. The negative voltages developed across condensers 128, 146 and 147 and the corresponding voltage drop developed across resistor 151 as the tubes of the system become activated, unless compensated for, is sufficient to produce a voltage pulse at plate 141 of tube 154, which voltage pulse would simulate the voltage pulse produced thereon in response to a negative signal voltage applied to grid 137 of tube 154. The necessary compensation is accomplished by producing a counterpotential of sufficient value to render the control grid 137 of tube 154 positive with respect to ground. The counterpotential is supplied by the voltage developed across condenser 162 which is charged from conductor 69 by way of resistors 163 and 164, condenser 162 and thence by way of resistor 132 to ground potential on conductor 76. When condenser 162 is fully charged, potential on conductor 69 is applied by way of resistors 151, 152, and 153 to grid 137 of tube 154. Thus, as switch 75 is closed upon immersion of the depth charge in water, condenser 162 discharges through neon bulb 165, resistor 166 and thence through resistor 151 and switch 75 to ground potential at conductor 76. The voltage drop thus produced across resistor 151 applies a positive potential to control grid 137 of tube 154 as negative potential is developed across condensers 146 and 147 as the tubes of the system become activated. Potential developed across condenser 127, as the voltage across winding 121 assumes its steady state value, elevates the potential across condenser 162 and thus insures that the positive voltage drop across resistor 151 exceeds the negative potential developed across condensers 128, 146 and 147. When tube 154 becomes activated, condenser 162 thereafter is discharged through the diode section of tube 154 by way of neon bulb 165, resistors 166 and 152 and thence to plate 144 and cathode 143 to ground potential on conductor 70, thus rapidly stabilizing the system and placing it in readiness to respond to signals received from a submarine as the depth charge descends through the water.

The character of the electronic circuits is such as to make possible the production of voltages in response to countermine shocks, which voltages simulate voltage pulses produced by signals received in response to the presence of a submarine. In order to prevent the development of such signals, an inertia switch 167 adapted to be closed in response to impulses of pressure received through the surrounding water such, for example, as those produced by countermine shocks, is employed to apply battery potential on conductor 69 to control grid 137 of tube 138 by way of switch 167, neon bulb 168, resistor 169 and resistors 135 and 136. Similarly, battery potential on conductor 69 is provided by way of switch 167, neon bulb 171, resistor 172 and resistors 152 and 153 to control grid 137 of tube 154. Concurrently with the application of battery voltage to the control grids of tubes 138 and 154, a condenser 173 is charged from conductor 69 by way of switch 167 and resistor 174. After switch 167 has opened, positive potential is maintained on control grids 137 of tubes 138 and 154 for an interval sufficient to permit the control circuit to stabilize following the countermine shocks by reason of the discharge of condenser 173 by way of resistor 174 and bulb 168, resistor 169 and thence through resistor 130 in parallel with resistors 135 and 136 in the diode and grid circuits of tube 138 respectively. A portion of the current flowing through resistor 174 also flows by way of bulb 171, and resistor 172 and thence through resistor 151 in parallel with the diode and grid circuits of tube 154 to ground potential on the other side of condenser 173. Before condenser 173 becomes fully discharged, however, bulbs 168 and 171 extinguish, and complete discharge of the condenser is accomplished by way of resistor 174, resistor 175, conductor 176 and thence by way of plate 177 and cathode 94 of the diode section of tube 92 to ground potential on conductor 70 when switch 75 is closed.

The voltage impulse developed at plate 141 of tube 138 in response to a signal which changes in value in the proper direction, is applied by way of a coupling condenser to the control grid 179 of a cold cathode gaseous discharge type trigger tube 181 whose plate 182 is connected to the high potential of battery 40 on conductor 69 and whose cathode 183 is connected by way of cathode load resistor 184, conductor 185 and thence by way of hydrostatic switch 186 to ground potential on conductor 76. Similarly, the voltage pulse developed at plate 141 of tube 154 is applied by way of coupling condenser 187 to control grid 179 of tube 188 which may be identical to tube 181. Plate 182 of tube 188 also is connected to battery potential on conductor 69 and cathode 183 thereof similarly is completed by way of cathode load resistor 189 and thence by way of conductor 185 and switch 186 to ground potential on conductor 76.

Control grids 179 of tubes 181 and 188 are maintained at a fixed bias potential such, for example, as 33 volts by reason of their connection with tap 191 of battery 40, conductor 192 and resistors 193 and 194 connected respectively to the control grids of tubes 181 and 188. Copper oxide rectifiers 195 and 196 are connected across resistors 193 and 194 respectively for the purpose of providing rapid discharge paths for condensers 178 and 187 respectively. These condensers are initially charged to the high potential of battery 40 on conductor 69 before tubes 138 and 154 are rendered conducting. When the tubes become conductive and the plate voltages thereof are reduced in an amount such, for example, as 30 volts, condensers 178 and 187 discharges by way of tubes 138 and 154 respectively, the return paths of the condensers being by way of rectifiers 195 and 196 respectively. Condensers 197 and 198 connected across plate load resistors 142 and 155 of tubes 138 and 154 serve as filters to prevent rapid voltage changes across their associated resistors.

When the potential on control grids 179 of tubes 181 and 188 is raised to a value such, for example, as 70 volts, these tubes are rendered conducting, the current discharge through tube 181, for example, flows in part through cathode load resistor 184 and thence to ground through switch 186 and in part by way of resistor 199, copper oxide rectifier 201 and thence by way of cathode load resistor 189 of tube 188 to ground potential on conductor 185, switch 186 being closed. Similarly, when tube 188 is rendered conducting, the current discharge therethrough flows in part through cathode load resistor 189 thereof and in part by way of resistor 200, copper oxide rectifier 212 and thence by way of cathode load resistor 184 of tube 181 to ground potential on conductor 185, switch 186 being closed. The voltage drop thus developed across either of resistors 184 or 189 depending on whichever of tubes 181 or 188 is conducting is applied by way of coupling condenser 202 to control grid 179 of tube 203 which may be identical to tubes 181 and 188 and whose plate 182 is connected to battery potential on conductor 69 and whose cathode 183 is connected through hydrostatic switch 204 to one side of an electro-responsive detonator 205. The other side of detonator 205 is connected through hydrostatic switch 206 to ground potential on conductor 76. Control grid 179 of tube 203 is normally biased at a potential such, for example, as 55 volts by reason of its connection through resistor 207 and conductor 208 to battery tap 209. This potential also is applied to cathode 183 of tube 203 by way of resistor 211 before switches 204 and 206 are closed. After these switches close, the cathode is maintained substantially at ground potential, the voltage drop across the detonator being of a low order by reason of the current therethrough which is insufficient to fire the detonator.

The voltage applied to control grid 179 of tube 203 when either of tubes 181 and 188 are fired is insufficient to elevate the potential on control grid 179 of tube 203 by more than a few volts above the bias potential thereon by reason of the voltage division produced by the cathode load resistor of the nonconducting one of tubes 181 or 188 and either of resistors 199 or 200 associated with the conducting tube, the voltage developed across the cathode load resistor of the nonconducting tube being only a few volts. Use of rectifiers 201 and 212 prevents the voltage division of the potential appearing across the cathode load resistor of the conducting one of tubes 181 or 188 from being such as to elevate the potential on the control grid of tube 203 to such a value as to fire the tube. Thus tube 203 is not fired in response to triggering of only one of tubes 181 or 188. When both of tubes 181 and 188 are fired, however, the cathode potential of the tubes is applied to condenser 202 and elevates the potential on the control grid side thereof sufficiently to render tube 203 conducting whereupon condenser 213 connected across the high potential side of battery 40 and ground potential at tap 77 thereof is discharged together with battery 40 through tube 203 and detonator 205 thereby to fire the detonator and fire in turn the booster charge 25 and charge 17 of the depth charge. Condenser 213 also serves as a decoupling filter for by-passing A.C. components in the electronic circuits.

A pair of neon bulbs 214 and 215 are connected in series with resistors 216 and 217 respectively across conductor 69 and ground potential on conductor 76 when switch 75 is closed. These bulbs, therefore, are continuously illuminated and provide a source of light for neon bulbs 165, 168 and 171 and trigger tubes 181, 188 and 203, bulbs 214 and 215 for this purpose being mounted in close proximity to the other neon bulbs and the trigger tubes. Such an arrangement is productive of a more efficient operation of the bulbs and tubes, it being well known that the ignition or breakdown potential of such gaseous discharge devices is stabilized by the presence of light. The neon bulbs may be of any type suitable for the purpose and preferably are of the type known in the art by the trade name of Tattelite. These bulbs have a high impedance when nonconducting and a low impedance when conducting and, therefore, are well adapted to produce the desired circuit effects when conducting and do not appreciably disturb the stability of associated circuits when nonconducting.

A plurality of suitable switches 225, 226, 227 and 228, here shown to be single pole double throw switches are employed for the purpose of converting the control system for use with depth charges of different structural configurations. The switches, for example, when placed in their dashed-line positions adjust the control circuits associated therewith such that a different predetermined range of frequencies may be effective to produce voltage pulses at the plates of tubes 138 and 154. Such a conversion is desirable for the reason that depth charges of different shapes descend through the water at different rates and thus produce signals of different periods. Also, depth charges of different shapes move angularly about in a different manner in the water during descent thereof and therefore produce different frequencies of spurious signals due to the local movement of the depth charges.

From the foregoing, the character and operation of the various electrical components comprising the electrical control circuits of the present invention should now be apparent and further operation thereof merely will be alluded to in the following general statement of operation of the depth charge which, it will be assumed, moves within the vicinity of a submarine after launching thereof. As the depth charge becomes immersed in the water, hydrostatic switches 75, 186, 204 and 206 close as plungers 218, 219 and 221 respectively associated therewith are driven under power of diaphragms 222, 223 and 224 individual thereto, the diaphragms in turn being moved in response to the pressure of the surrounding water. After a predetermined interval of time corresponding to the time required for the depth charge to descend through the water to a depth such, for example, as 15 feet, the steady state positive and negative voltages are developed across condensers 127 and 128 respectively.

As the scalar value of the ambient magnetic field of the depth charge varies as the depth charge changes its position with respect to the submarine, the steady state value of the positive and negative voltages changes in one direction or the other and thus produces an electrical signal which causes a voltage pulse to be developed at the plate of either of tubes 138 or 154 according to the direction of change of value of the signal. Assuming, for example, that the voltage pulse is developed at the plate of tube 138, this voltage pulse, if of sufficient amplitude, renders tube 181 conductive. If, thereafter, a signal of proper polarity is received to produce a voltage pulse at the plate of tube 154, tube 188 is rendered conductive, thereby to render tube 203 conductive in turn, as set forth in detail hereinbefore. When tube 203 is rendered conductive a circuit is completed for firing the detonator to explode the depth charge as it moves into a position in which it is effective to destroy or damage the submarine.

From the foregoing it should now be apparent that a firing control system for the depth charge has been provided which is well adapted to fulfill the aforestated objects of the invention. Moreover, while the invention has been described in particularity with respect to the adaptability thereof for the purpose of controlling the firing of a depth charge, it will be apparent to those skilled in the art to which the invention appertains that the invention also may be used to great advantage in controlling other devices in response to changes in the scalar value of the ambient field of devices embodying the detector and control circuits of the invention, such devices, for example, being employed for measuring the scalar value of the ambient field or selectively of changes in the value thereof. It is our intention therefore in the appended claims to cover all such embodiments and changes and modifications thereof as are commensurate with the spirit and scope of the invention as defined by the appended claims.

The invention herein described may be manufactured and used by or for the Government of the United States of America for governmental purposes without payment of any royalties thereon or therefor.

What is claimed as new and desired to be secured by Letters Patent of the United States is:

1. In a firing control system for a depth charge, the combination of a total field magnetometer detector adapted to yield a measurable quantity variably in accordance with changes in the scalar value of the ambient magnetic field of a depth charge as it moves within the vicinity of a submarine to be destroyed thereby, means including a bridge circuit having said detector connected therewith to form a portion thereof for producing an electrical signal variably in accordance with variations in said quantity, distortion-preventing means in said bridge circuit for substantially suppressing harmonic frequency current flow therein, a firing circuit for the depth charge, and means controlled by the electrical signal for rendering the firing circuit effective when the signal changes by predetermined amounts in opposite directions successively.

2. In a firing control system for a depth charge, the combination of a total field magnetometer detector adapted to yield a measurable quantity variably in accordance with changes in the scalar value of the ambient magnetic field of a depth charge as it moves within the vicinity of a submarine to be destroyed thereby, a bridge circuit having said detector arranged therein, means including said bridge circuit for producing an electrical signal variably in accordance with variations in said quantity, means within the bridge circuit for reducing flow of harmonic frequency currents therein to a minimum thereby to substantially prevent distortion of said electrical signal, a firing circuit for the depth charge, and means controlled by the electrical signal for rendering the firing circuit effective when the signal changes by predetermined amounts in opposite directions successively.

3. In a firing control system for a depth charge, the combination of a total field magnetometer detector adapted to yield a measurable quantity variably in accordance with changes in the scalar value of the ambient magnetic field of a depth charge as it moves within the vicinity of a submarine to be destroyed thereby, a bridge circuit including said detector and having an output circuit for producing an electrical signal variably in accordance with variations in said quantity, means for supplying the bridge circuit with a pure sinusoidal current of substantially constant value, a transformer having a ferromagnetic core and three windings disposed thereabout, two of said windings being disposed in opposite legs of the bridge and adapted to reduce the flow of harmonic frequency currents therein, means in said output circuit and including the third of said windings for adjusting the degree of unbalance in the bridge circuit in an external field of predetermined value, a firing circuit for the depth charge, and means controlled by the electrical signal for rendering the firing circuit effective when the signal changes by predetermined amounts in opposite directions successively.

4. In a firing control system for a depth charge, the combination of a total field magnetometer detector adapted to yield an electrical quantity variably in accordance with changes in the scalar value of the ambient magnetic field of depth charge as it moves within the vicinity of a submarine to be destroyed thereby, a bridge circuit including said detector for producing an electrical signal variably in accordance with variations in said quantity, an oscillator for supplying the bridge circuit with a pure sinusoidal current of optimum value, means responsive to deviations in the value of the voltage supplied by the oscillator for maintaining the amplitude of oscillation thereof substantially constant thereby to maintain the value of the current at said optimum value, a firing circuit for the depth charge, and means controlled by said electrical signal for rendering the firing circuit effective when the signal changes by predetermined amounts in opposite directions successively.

5. In a firing control system for a depth charge, the combination of a total field magnetometer detector adapted to yield a measurable quantity variably in accordance with changes in the scalar value of the ambient magnetic field of a depth charge as it moves within the vicinity of a submarine to be destroyed thereby, a bridge circuit including said detector and having an output circuit for producing an electrical signal variably in accordance with variations in said quantity, means for supplying the bridge circuit with a pure sinusoidal current of substantially constant value, a transformer having a ferromagnetic core and three windings two of which are disposed in opposite legs of the bridge circuit and adapted to reduce the flow of harmonic frequency currents therein, means in said output circuit and including the third of said windings for balancing the bridge circuit in an external field of predetermined value, means in the output circuit for filtering harmonic frequency current components and adapted to increase by many times the gain of the electrical signal in the output circuit, a firing circuit for the depth charge, and means controlled by the electrical signal for rendering the firing circuit effective when the signal changes by predetermined amounts in opposite directions successively.

6. In a firing control system for a depth charge, the combination of a firing circuit therefor, means for producing an electrical signal variably in accordance with changes in the scaler value of the ambient magnetic field of the depth charge as it moves within the vicinity of a submarine to be destroyed thereby, electronic control means controlled by the electrical signal and including a plurality of vacuum tubes for rendering the firing circuit effective when the signal changes by predetermined amounts in opposite directions successively, means for activating the vacuum tubes as the depth charge becomes immersed in the surrounding water thereby to arm said control means, and means for preventing operation of the firing circuit in response to voltages generated by the control means during arming thereof.

7. In a firing control system for a depth charge, the combination of a firing circuit therefor, means for producing an electrical signal variably in accordance with changes in the scalar value of the ambient magnetic field of the depth charge as it moves within the vicinity of a submarine to be destroyed thereby, means controlled by the electrical signal for rendering the firing circuit effective when the signal changes by predetermined amounts in opposite directions successively, and means responsive to the rate of change of the signal for preventing operation of the firing circuit when the rate of change of the signal deviates from predetermined values.

8. In a depth charge firing control system of the character disclosed, means for generating an electrical signal variably in accordance with changes in the scalar value of the ambient magnetic field of the depth charge as it changes position with respect to a submarine to be destroyed thereby, a pair of electronic control channels responsive to said signal and adapted to develop signal voltages which correspond to the amplitude-time functions of increases and decreases in the signal respectively, means included within each of said channels for filtering voltages developed therein and having amplitude-time functions differing from those of the signal, a firing circuit for the depth charge, and means controlled by the electronic channels for rendering said firing circuit effective when both of the electronic channels have developed said signal voltages in response to changes in said signal individual thereto.

9. In a depth charge firing control system of the character disclosed, means for generating an electrical signal variably in accordance with changes in the scalar value of the ambient magnetic field of the depth charge as it changes position with respect to a submarine to be destroyed thereby, a pair of electronic control channels controlled by said signal and adapted to develop signal voltages of opposite polarities in response to increases and decreases in said signal respectively, means individual to each of said channels for rapidly dissipating voltages developed therein and having polarities opposite to the polarities of the signal voltages developed therein, a firing circuit for the depth charge, and means controlled by the electronic channels for rendering the firing circuit effective when the signal voltages of both channels have been developed thereby.

10. In a depth charge firing control system of the character disclosed, means for generating an electrical signal variably in accordance with changes in the scalar value of the ambient magnetic field of the depth charge as it changes position with respect to a submarine to be destroyed thereby, a pair of electronic control channels controlled by said signal, each of said channels including an electron discharge device having a diode section and a grid controlled pentode section, each of said pentode sections having a plate, means responsive to an increase in the signal for developing a voltage pulse on the plate of one of said discharge devices, means responsive to said increase in the signal for causing voltages developed thereby in the control channel including the other of said discharge devices to be dissipated through the diode section of said other discharge device, means responsive to a decrease in the signal for developing a voltage pulse at the plate of said other of the electronic discharge devices, means responsive to said decrease in the signal for causing voltages generated thereby in the control channel including said one of the discharge devices to be dissipated through the diode section thereof, a firing circuit for the depth charge, and means controlled by the electronic control channels for rendering the firing circuit effective when voltage pulses have been developed on the plates of both of the electron discharge devices.

11. In a depth charge firing control system of the character disclosed, means for generating an electrical signal variably in accordance with changes in the scalar value of the ambient magnetic field of the depth charge as it changes position with respect to a submarine to be destroyed thereby, a pair of electronic control channels adapted to be controlled by said signal, each of said channels including an electron discharge device having a control grid and a cathode, an input circuit for the control grid of each of the discharge devices, each of said input circuits including a rectifier, means responsive to an increase in the signal for developing a voltage pulse on the cathode of one of said discharge devices, means responsive to said increase in the signal for causing voltages developed thereby in the control channel including the other of said discharge devices to be dissipated through the rectifier individual to the grid circuit therefor, means responsive to a decrease in the signal for developing a voltage pulse at the cathode of said other of the electronic discharge devices, means responsive to said decrease in the signal for causing voltages generated thereby in the control channel including said one of the discharge devices to be dissipated through the rectifier individual to the grid circuit therefor, a firing circuit for the depth charge, and means controlled by the electronic control channels for rendering the firing circuit effective when voltage pulses have been developed on the cathodes of both of the electron discharge devices.

12. In a depth charge firing control system of the character disclosed, means for generating an electrical signal variably in accordance with changes in the scalar value of the ambient magnetic field of the depth charge as it changes position with respect to a submarine to be destroyed thereby, a pair of electron discharge devices each having a diode and pentode section, each of said pentode sections having a control grid, means responsive to an increase in the signal for developing a negative voltage pulse on the control grid of one of the electron discharge devices, means responsive to a decrease in the signal for developing a negative voltage pulse on the control grid of the other of the electron discharge devices, an energy storage device, means responsive to impulses of pressure received through the surrounding water for causing positive voltages to be applied to the control grids of the electron discharge devices and concurrently therewith for causing energy to be stored in said storage device, means including said energy storage device for maintaining said positive voltages on the control grids for an interval sufficient to permit subsiding of said impulses of pressure as the energy storage device is discharged, means including the diode sections of said electron discharge devices for providing a discharge path for the energy storage device, a firing circuit for the depth charge, and means controlled by the electron discharge devices for rendering the firing circuit effective when said negative voltages are developed on the control grids successively.

13. In a depth charge firing control system of the character disclosed, means for generating an electrical signal variably in accordance with changes in the scalar value of the ambient magnetic field of the depth charge as it changes position with respect to a submarine to be destroyed thereby, a pair of electron discharge devices each having a diode and pentode section, each of said pentode sections having a control grid, means responsive to an increase in the signal for developing a negative voltage pulse on the control grid of one of the electron discharge devices, means responsive to a decrease in the signal for developing a negative voltage pulse on the control grid of the other of the electron discharge devices, an energy storage device, switch means adapted to be closed in response to impulses of pressure received through the surrounding water, voltage responsive switch means, a source of energy, means including said voltage responsive switch means and said pressure responsive switch means for causing positive voltages to be applied to the control grids of the electron discharge devices from said source of energy and for concurrently causing energy to be stored therefrom in said storage device, means including said energy storage device and said voltage responsive switch means for maintaining said positive voltages on the control grids for an interval sufficient to permit subsiding of said impulses of pressure as the energy storage device is discharged, means including the diode sections of said electron discharge devices for providing a discharge path for the energy storage device, a firing circuit for the depth charge, and means controlled by the electron discharge devices for rendering the firing circuit effective when said negative voltages are developed on the control grids successively.

14. In a firing control system for a depth charge of the character disclosed, the combination of means for developing a voltage as the depth charge is launched, said voltage having a predetermined value controlled by the scalar value of the earth's magnetic field in the zone of the earth in which the depth charge is launched, means responsive to the scalar value of the ambient magnetic field of the depth charge as it changes position with respect to a submarine to be destroyed thereby for causing the value of said voltage to be increased and decreased in accordance with increases and decreases in the scalar value of the ambient field respectively, a pair of electron discharge devices each having a plate, means responsive to an increase in said voltage above said predetermined value thereof for developing a voltage pulse on the plate of one of said electron discharge devices, means responsive to a decrease in said voltage below said predetermined value thereof for causing a voltage pulse to be developed on the plate of the other of said electron discharge devices, means for preventing a voltage pulse from being developed on the plate of said one of the electron discharge devices as said voltage is initially developed to the predetermined value thereof, a firing circuit for the depth charge, and means controlled by the electron discharge devices for rendering the firing circuit effective when voltage pulses are developed successively on the plates of the electron discharge devices.

15. In a firing control system for a depth charge of the character disclosed, the combination of means for developing a voltage as the depth charge is launched, said voltage having a predetermined value controlled by the scalar value of the earth's magnetic field in the zone of the earth in which the depth charge is launched, means responsive to the scalar value of the ambient magnetic field of the depth charge as it changes position with respect to a submarine to be destroyed thereby for causing the value of said voltage to be increased and decreased in accordance with increases and decreases in the scalar value of the ambient field respectively, a pair of electron discharge devices each having a plate, means responsive to an increase in said voltage above said predetermined value thereof for developing a voltage pulse on the plate of one of said electron discharge devices, means responsive to a decrease in said voltage below said predetermined value thereof for causing a voltage pulse to be developed on the plate of the other of said electron discharge devices, an energy storage device, means including a voltage responsive switch means for causing a potential to be developed on said energy storage device before the depth charge is launched, means including the energy storage device for causing the potential developed thereon to oppose the development of a voltage pulse on the plate of said one of the electron discharge devices as said voltage is initially developed to the predetermined value thereof, a firing circuit for the depth charge, and means controlled by the electron discharge devices for rendering the firing circuit effective when voltage pulses are developed successively on the plates of the electron discharge devices.

16. In a firing control systm for a depth charge, the combination of a total field magnetometer detector adapted to yield a measurable quantity variably in accordance with changes in the scalar value of the ambient magnetic field of the depth charge as it moves within the vicinity of a submarine to be destroyed thereby, a bridge circuit including said detector and having an output circuit for producing an electrical signal variably in accordance with variations in said quantity, means for supplying the bridge circuit with a pure sinusoidal current of substantially constant value, said bridge circuit including an inductive balance element for said detector adapted to vary in value in the same manner as the detector in response to variations in the value of said current whereby the degree of unbalance of the bridge circuit is not substantially altered in response to such current variations, a firing circuit for the depth charge, and means controlled by the electrical signal for rendering the firing circuit effective when the signal changes by predetermined amounts in opposite directions successively.

17. In a firing control system for a depth charge, the combination of a total field magnetometer detector adapted to yield a measurable quantity variably in accordance with changes in the scalar value of the ambient magnetic field of the depth charge as it moves within the vicinity of a submarine to be destroyed thereby, a bridge circuit including said detector and having an output circuit for producing an electrical signal variably in accordance with variations in said quantity, means for supplying the bridge circuit with a pure sinusoidal current of substantially constant value, said bridge circuit including an inductive balance element for said detector adapted to vary in value in the same manner as the detector in response to variations in the value of said current whereby the degree of unbalance of the bridge circuit is not substantially altered in response to such current variations, shield means for said balance element for preventing the inductive value thereof from being altered due to the presence of an external field, a firing circuit for the depth charge, and means controlled by the electrical signal for rendering the firing circuit effective when the signal changes by predetermined amounts in opposite directions successively.

References Cited in the file of this patent
UNITED STATES PATENTS

| | | |
|---|---|---|
| 2,400,549 | Glennon et al. | May 21, 1946 |
| 2,406,870 | Vacquier | Sept. 3, 1946 |
| 2,483,417 | Johnson | Oct. 4, 1949 |
| 2,485,931 | Slonczewski | Oct. 25, 1949 |